US008740057B2

(12) United States Patent
Stoops

(10) Patent No.: US 8,740,057 B2
(45) Date of Patent: Jun. 3, 2014

(54) DEVICE FOR INTERFACING A POINT-OF-SALE SYSTEM AND A CASH DRAWER

(76) Inventor: Kevin Ray Stoops, Bucyrus, KS (US)

( * ) Notice: Subject to any disclaimer, the term of this patent is extended or adjusted under 35 U.S.C. 154(b) by 716 days.

(21) Appl. No.: 11/462,538

(22) Filed: Aug. 4, 2006

(65) Prior Publication Data

US 2007/0181679 A1 Aug. 9, 2007

Related U.S. Application Data

(60) Provisional application No. 60/705,527, filed on Aug. 4, 2005.

(51) Int. Cl.
*G06K 19/00* (2006.01)

(52) U.S. Cl.
USPC ............................ 235/7 R; 235/375; 235/379

(58) Field of Classification Search
USPC .............................................. 235/7 R, 10, 22
See application file for complete search history.

(56) References Cited

U.S. PATENT DOCUMENTS 5,233,167 A * 8/1993 Markman et al. ............. 235/375
2005/0283403 A1 * 12/2005 Ramirez et al. ................. 705/16

* cited by examiner

*Primary Examiner* — Michael G. Lee
*Assistant Examiner* — Matthew Mikels
(74) *Attorney, Agent, or Firm* — Kutak Rock LLP; Bryan P. Stanley

(57) ABSTRACT

Provided is a device for interfacing between a POS system having a first connection requirement, such as a serial connection requirement, and a cash drawer having a second connection requirement different from the first connection requirement. The device includes a circuit adapted to receive a signal from the POS system and open the cash drawer, or else generate a signal to the cash drawer that is recognized by the cash drawer as the signal to open.

21 Claims, 4 Drawing Sheets

DEVICE FOR INTERFACING A POINT-OF-SALE SYSTEM AND A CASH DRAWER

CROSS-REFERENCE TO RELATED APPLICATIONS

This application claims benefit of U.S. Provisional Patent Application No. 60/705,527, filed on Aug. 4, 2005, which is incorporated by reference herein in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

The present device is directed generally to providing an interface between a point-of-sale system and a cash drawer, and more specifically to providing an interface between a point-of-sale system requiring a cash drawer with a serial port and a CDKO-style cash drawer having no serial port.

Cash drawers and point-of-sale (POS) systems associated with them are well-known in the art. In the past, POS software has required that a cash drawer include a serial port in order to receive the appropriate command to open the cash drawer. Such systems generally operate by sending any character to the cash drawer, often in repetition, in order to open the cash drawer. Such systems suffer from inefficiency due to the sending of multiples characters to the cash drawer, and are also limited in that more than one cash drawer cannot be readily controlled by the same POS software system because any cash drawer on the system will respond to any character sent by the system by opening the drawer. Further, cash drawers with serial ports tend to be relatively expensive.

Newer, less expensive cash drawers rely on modern hardware rather than serial ports. Such cash drawers are typically termed cash drawer kick out (CDKO) type cash drawers. Such cash drawers have a number of advantages over older cash drawers, and are desired in the marketplace. Such cash drawers are not, however, compatible with POS software requiring a cash drawer with a serial port. In other words, older POS software is not generally compatible with much of the new POS hardware. Because POS software may represent a business investment of tens of thousands of dollars, it is often not cost-effective for a business to replace its POS software to keep up with hardware changes.

The present invention provides an interface between a POS system requiring a cash drawer with a serial port, and a cash drawer having non-serial port hardware (such as a CDKO cash drawer).

BRIEF SUMMARY OF THE INVENTION

Provided is a device for interfacing between a POS system having a first connection requirement, such as a serial connection requirement, and a cash drawer having a second connection requirement different from the first connection requirement. The device includes a circuit adapted to receive a signal from the POS system and open the cash drawer, or else generate a signal to the cash drawer that is recognized by the cash drawer as the signal to open.

In another aspect of the present invention, the second connection requirement is a USB connection.

In still another aspect of the present invention, the device is adapted to work at a baud rate of from about 300 to about 57600, and to automatically detect the required baud rate.

In another aspect of the present invention, the device is adapted to convert data received from a POS system from RS-232 to 5 volt logic.

In another aspect of the present invention, the device is adapted to open the cash drawer, either by opening it directly or generating a signal recognized by the cash drawer as an open signal, in response to a single character from the POS system.

In another aspect of the present invention, the device is adapted to communicate with more than one cash drawer, each cash drawer being opened by a unique single character received from said POS system.

In another aspect of the present invention, the device is adapted to operate at a single baud rate, the single baud rate being programmed into the device prior to installation thereof.

DETAILED DESCRIPTION OF THE INVENTION

Turning now to the drawings wherein like numerals represent like parts, the numeral 10 refers generally to an interface device constructed in accordance with the teachings of the present invention. Device 10 includes a housing 12, a first connector portion 14, and a second connector portion 16.

Figure 1:
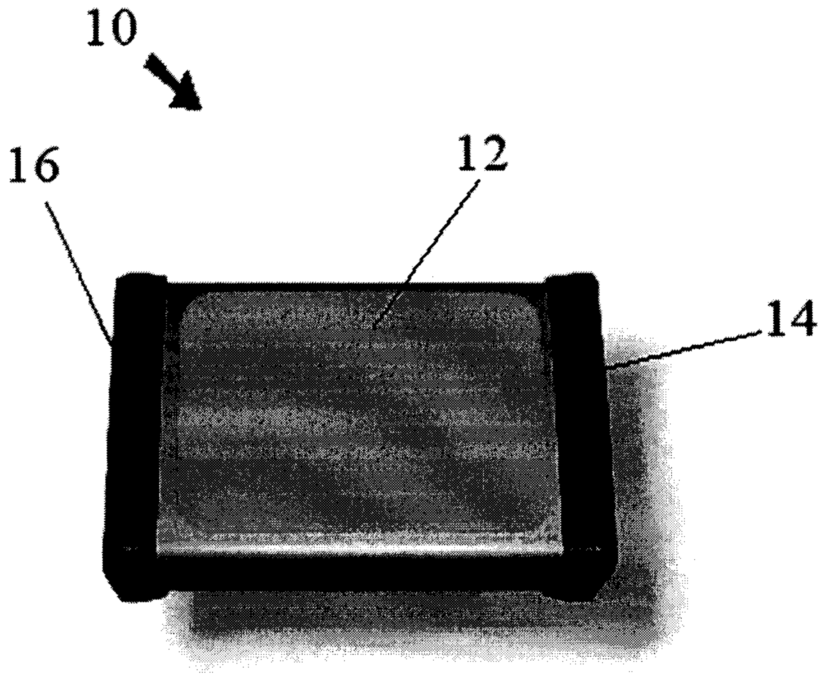
FIG. 1 is a perspective view of one embodiment of an interface device constructed in accordance with the teachings of the present invention.

Housing 12 may be constructed from any suitable material and is preferably an enclosed structure housing the circuitry of device 10 therein. Although shown as generally rectangular in shape, it is contemplated that any shape, design, or size housing may be utilized depending on the needs or desire of the user of device 10. The circuitry within housing 12, discussed further below, includes a portion adapted to interface with a POS system requiring a serial connector, as well as a portion adapted to interface with a non-serial cash drawer. The serial connector interface is shown generally in FIG. 1 by first connector portion 14. The non-serial cash drawer connector interface is shown generally in FIG. 1 by second connector portion 16. The present device is a stand-alone device that may be adapted to be used with any cash drawer and POS software system.

Figure 2:
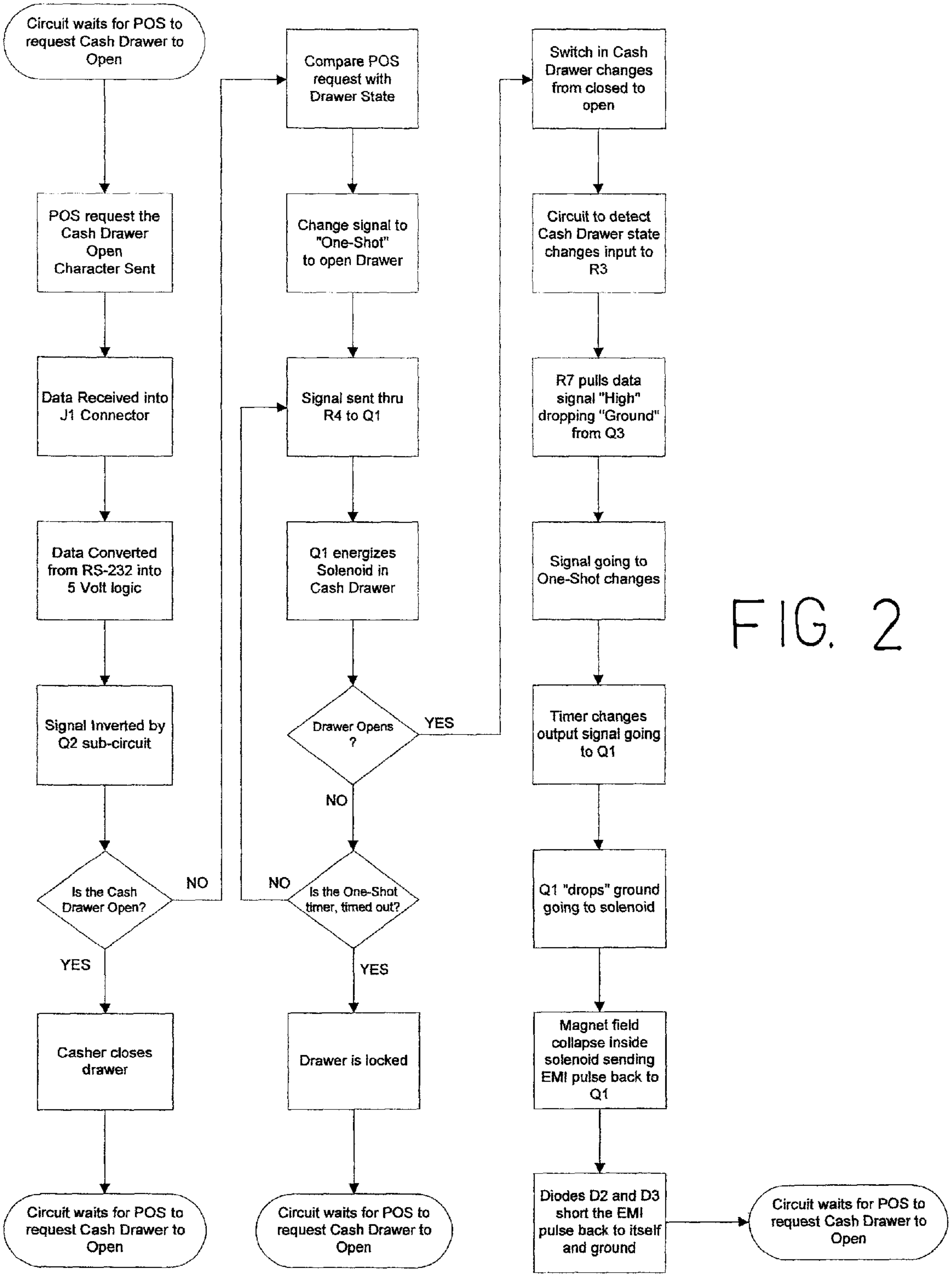
FIG. 2 is a logic diagram illustrating the functionality of one embodiment of a device constructed in accordance with the teachings of the present invention.

FIG. 2 provides a logic or flow diagram illustrating the logic processes undertaken by an exemplary embodiment of the present invention. As can be seen in the figure, device 10 is generally in a standby state, waiting for a request from the POS system to open the cash drawer. The present device preferably requires that only a single character be sent from the POS system, and multiple cash drawers may be provided, each being adapted to open upon receipt by device 10 of a separate character. The data sent from the POS system is received into a J1 connector (shown in the circuit diagram in FIG. 3) housed within first connector portion 14. The J1 connector is, in the embodiment shown, a DB-9 connector used to connect the POS system to the input of the circuit of the present device. The J1 connector receives signals from the POS system either on pin 2 or pin 3. The POS system can be configured as either a data terminal equipment (DTE) or data communications equipment (DCE) device. Connecting pins 4, 1, and 6 together, and pins 7 and 9 together, respond to the POS system that device 10 is ready to receive signals from a DTE or DCE cable, and converts the cable to emulate a null-modem cable. This allows the connecting cable to be either a null-modem cable or a straight-thru cable for proper operation. The signal received from J1 pins 2 or 3 is sent to a RS-232 receiver U1.

Figure 3:
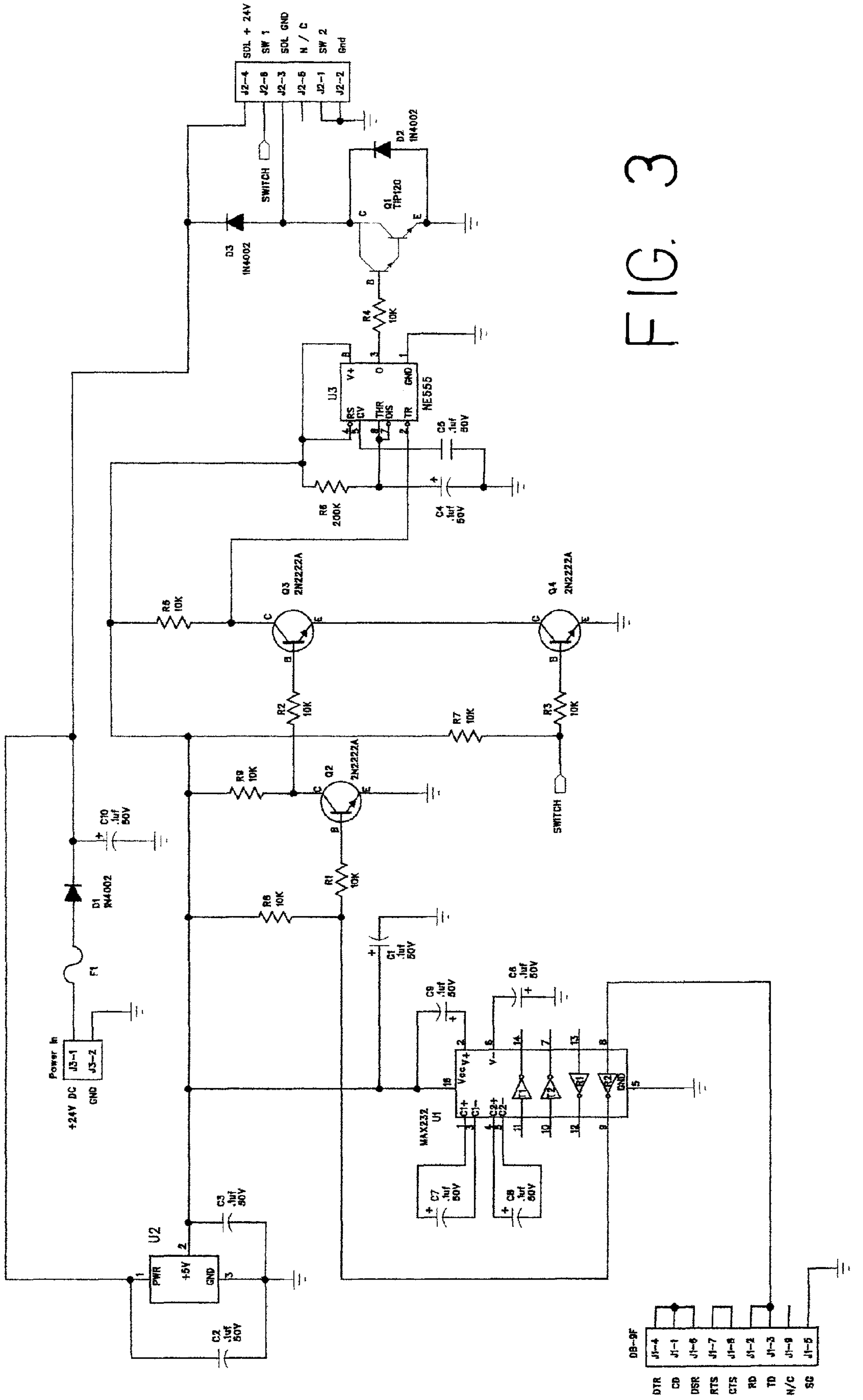
FIG. 3 is a circuit diagram depicting a circuit of one embodiment of the present invention.

In the embodiment of the present invention shown in FIGS. 2 and 3, the data received from the POS system is converted from RS-232 to 5 volt logic (this is accomplished by the conversion sub-circuit, which includes C6, C7, C8 and C9 in the embodiment of the present invention shown in FIG. 3) and the signal is inverted by the Q2 sub-circuit. Device 10 is able, then, to determine the state of the cash drawer (e.g. open or closed).

If the cash drawer is open, the signal from the POS system is interpreted to request that the cash drawer be closed, and the cash drawer is closed accordingly. Device 10 then goes back into standby mode, with the circuit waiting to receive a signal from the POS system.

If the cash drawer is closed when device 10 determines the state of the cash drawer, then device 10 compares the POS request with the state of the cash drawer, determines that a signal is needed to open the cash drawer, and generates a single character signal to open the cash drawer. This signal is sent from R4 to Q1 (as shown in the circuit diagram in FIG. 3). Q1 is a driver transistor used to signal the solenoid in the cash drawer. The signal from R4 to Q1 energizes this solenoid. Device 10 then once again determines the state of the cash drawer. If the drawer is still closed, device 10 repeats the signal from R4 to Q1 for so long as a 'one-shot' timer is active. If the one-shot timer times out, device 10 determines that the cash drawer is locked and goes back into standby mode.

If the cash drawer is open after the signal from R4 to Q1, then the switch in the cash drawer changes from closed to open. Q4, R3, and R7 in FIG. 3 make up the condition state sub-circuit. The function of R3 and Q4 is to check the cash drawer's state. When connector J2 is connected to a cash drawer and the drawer is closed, the switch inside the cash drawer is closed. Connector J2 pin 1 is connected to J2 pin 6. This will ground the base of Q4, allowing the transistor Q4 to act as a switch and pass the ground to the emitter of Q3. When the cash drawer is open, the switch inside the cash drawer will be 'open.' This allows R7 to hold the Q4 transistor's base in the 'high' state and thus disconnects the ground from the connector of Q4.

Next, the signal going to the one-shot timer circuit changes and the timer changes the output signal going to Q1. U3, C4, and R6 (FIG. 3) make up the 'one-shot' timer circuit used to send a signal to open the cash drawer for a predetermined amount of time when all previous checks are true. The timer, when triggered by a 'low' signal on U3 pin 2, causes the state of U3 pin 3 to change from 'low' to 'high' for the duration (in seconds) derived from Equation 1:

$$\text{Time (sec)}=1.1*(R6*C4) \quad \text{Equation 1}$$

This 'high' pulse from the timer circuit sends a signal through the resistor referenced by R4 to the driver transistor Q1. Resistor R4 is used to limit the current drain from transistor U3 pin 3 by transistor Q1.

Q1, in turn, drops the ground going to the solenoid, causing the magnetic field inside the solenoid to collapse and sending an EMI pulse back to Q1. Diodes D2 and D3 (FIG. 3) short the EMI pulse back onto itself and to the ground, thereby protecting Q1 and eliminating the EMI pulse. Device 10 is then once more in standby mode.

Other features of the circuit diagram shown are as follows: capacitors C1, C2, C3, and C10 in FIG. 3 are used to filter the power and protect the circuit from pulses or EMI discharges; diode D1 is used to protect the circuit from reverse power being supplied; and fuse F1 protects the circuit, cash drawer, and POS system from excessive current. If reverse power is supplied to connector J3, the circuit will not power up and the circuit will not open the cash drawer when a signal is sent to the circuit from the POS system.

Figure 4:
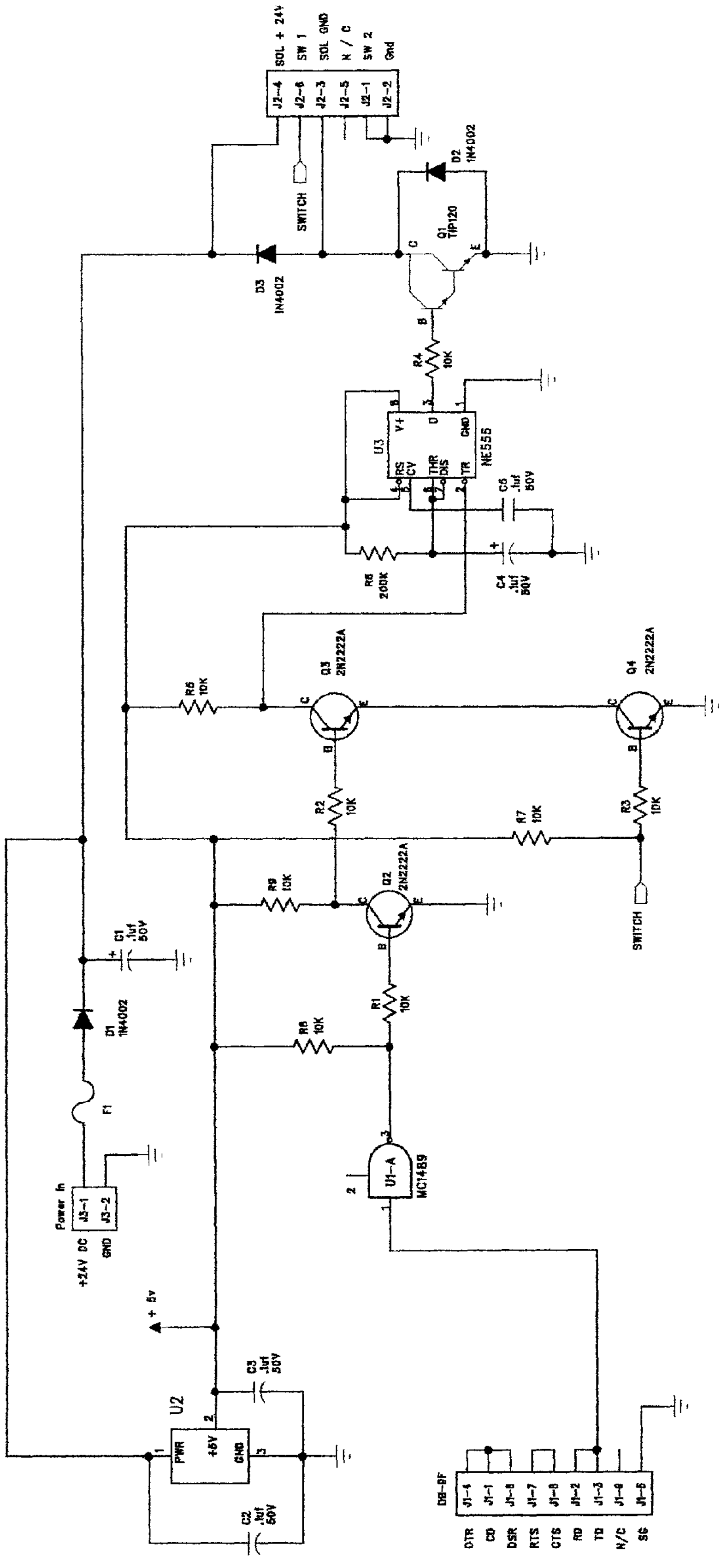
FIG. 4 is a circuit diagram depicting a circuit of an alternate embodiment of the present invention.

FIG. 4 provides a circuit diagram for one alternate embodiment of the present invention. The circuit diagram shown in FIG. 4 is substantially the same as that shown in FIG. 3, however an alternate conversion sub-circuit is provided. This alternate circuit reduced the need for capacitors C8, C9, and C6, and also results in the replacement of the U1 Maxim Max232 (as used in the embodiment shown in FIG. 3) with the Motorola part MC 1489 RS-232 receiver. This alternate circuit does not generate the +12v and −12v needed for transmitting RS-232 signals. This sub-circuit inverts the data coming out of the output going to the inverting sub-circuit, Q2, R1, and R8.

As can be send from the discussion above, as well as from FIGS. 2 and 3, the embodiment of the present device described does not use a microprocessor to determine how to react to signals, nor does it use a universal asynchronous receiver transmitter to decode signals sent from a POS system serial port. The embodiment of the present device described above relies entirely on discrete logic. Further, the circuit described above operates on two different voltages. The primary voltage is unique to the cash drawer; the second voltage is the internal voltage of 5 volts. This allows cash drawers that operate on different voltages to be controlled. Serial port connection J1 is preferably configured so that the POS system will be able to receive a "clear to send" (CTS) signal, as well as a "data terminal ready" (DTR) signal when either a straight-through or null-modem cable is connected.

Thus, as described above, the present device provides an interface between a POS system requiring a cash drawer with a serial port and a non-serial cash drawer (such as a CDKO cash drawer). The present device relies only upon a single character, any character, to open the cash drawer.

In an alternate embodiment of the present invention, the device still relies only upon a single character to open a cash drawer, but that character is specific for each cash drawer on the system. For example, a first cash drawer may be present and the present device may be adapted to open this drawer only upon receipt of an "A" or "a" from the POS system, whereas a second cash drawer may be adapted to open only upon receipt of a "B" or "b" from POS system. Thus, rather than a situation in which a cash drawer is opened upon receipt of any character, the present device is able to handle more than one cash drawer and distinguish among characters received from the POS system. In such an embodiment, the present device preferably works at only one baud rate once installed, though it can be programmed prior to installation to work at any one baud rate. By contrast, the embodiment described with respect to FIGS. 3 and 4, above, works at any baud rate from 300 to 57,600, with the baud rate being automatically detected.

In yet another alternative embodiment, the present device is adapted for use with a USB port rather than a serial port.

The foregoing description is exemplary only. It is contemplated that many additional modifications to the present device will be readily apparent to those of skill in the art upon reading this disclosure. It is further contemplated that one of skill in the art, upon reading this disclosure, may readily design alternate circuits that have the functionality of the present device, and it is therefore contemplated that the present device is not limited by the circuit diagrams provided herewith, nor by details presented in the foregoing description. Rather, the present invention is limited only by the claims that follow.

The invention claimed is:

1. A device for interfacing a POS system requiring a cash drawer having a first connection requirement with a cash drawer having a second connection requirement, the second connection requirement being different from the first connection requirement, the device comprising a circuit adapted to convert a signal from said POS system into a signal recognizable by said cash drawer and a housing that encloses said circuit such that the device operates physically separate from the cash-drawer and physically separate from the POS system, wherein the first connection requirement is selected from a requirement for a serial port or a USB port, and wherein the second connection requirement is selected from a requirement for a USB port, a six pin connector port, or an other connector port adaptable for use with a CDKO cash drawer.

2. The device according to claim 1, said device further comprising:

a first connector portion for connecting to said POS system; and a second connector portion for connecting to said cash drawer.

3. The device according to claim 1 wherein said first connection requirement is a requirement for a serial port, and further wherein said second connection requirement is a requirement for other than a serial port.

4. The device according to claim 3 wherein said second connection requirement is a requirement for a USB port.

5. The device according to claim 1 wherein said device is adapted to receive the signal from said POS system at any baud rate from about 300 to about 57,600during operation.

6. The device according to claim 1 wherein said device converts data received from said POS system from RS-232 to 5 volt logic.

7. The device according to claim 1 wherein said device is adapted to generate a signal to said cash drawer in response from a single character received from said POS system.

8. The device according to claim 7 wherein said device is adapted for use with more than one cash drawer simultaneously, and further wherein each of said more than one cash drawers is controlled by a different single character received from said POS system.

9. The device according to claim 8 wherein said device is adapted to operate at a single baud rate, said single baud rate being programmed into said device prior to installation of said device.

10. A device for interfacing a POS system requiring a cash drawer having a first connection requirement with a cash drawer having a second connection requirement, the second connection requirement being different from the first connection requirement, the device comprising:

a housing portion having a first side and a second side that physically separates the device during operation from the cash-drawer and physically separates the device from the POS system;

a circuit portion enclosed within said housing portion between said first side and said second side;

a first connector portion fixedly attached to the first side of said housing portion; and a second connector portion fixedly attached to the second side of said housing portion, said first connector portion being adapted to connect with said POS system, said second connector portion being adapted to connect with said cash drawer, and said circuit being adapted to recognize a signal from said POS system and thereupon open said cash drawer, wherein the first connector portion is a serial connector and the second connector portion is selected from a connector other than a serial connector.

11. The device according to claim 10 wherein said second connector portion is a USB connector.

12. The device according to claim 10 wherein said device is adapted to operate at any baud rate from about 300 to about 57,600and further wherein said device automatically detects the baud rate required.

13. The device according to claim 10 wherein said device converts data received from said POS system from RS-232 to 5 volt logic.

14. The device according to claim 10 wherein said device is adapted to open said cash drawer in response to receiving a single character from said POS system.

15. The device according to claim 14 wherein said device is adapted for use with more than one cash drawer simultaneously, and further wherein the opening of each of said more than one cash drawer is initiated by the receiving of a different single character by said device from said POS system.

16. A method for interfacing a POS system requiring a cash drawer having a first connection requirement with a cash drawer having a second connection requirement, the second connection requirement being different from the first connection requirement, wherein the first connection requirement is selected from a requirement for a serial port or a USB port, and wherein the second connection requirement is selected from a requirement for a USB port, a six pin connector port, or an other connector port adaptable for use with a CDKO cash drawer, the method comprising the steps of:

a) providing a circuit, said circuit being in communication with a POS system having a first connection requirement and further being in communication with a cash drawer having a second connection requirement, the second connection requirement being different from said first connection requirement;

b) providing a housing for said circuit that physically separates the circuit during operation from said cash-drawer and physically separates the circuit from said POS system;

c) receiving with said circuit at least one signal from said POS system, said at least one signal being directed to opening said cash drawer;

d) opening said cash drawer using a signal generated by said circuit.

17. The method according to claim 16 wherein said signal generated by said circuit in step c) is recognized by said cash drawer as a signal to open said cash drawer.

18. The method according to claim 16 wherein said first connection requirement is a serial port.

19. The method according to claim 18 wherein said second connection requirement is a USB port.

20. The device according to claim 1 wherein said device includes an RS-232 connector for receiving the signal from said POS system on pins 2 or 3 of said connector, said connector including pins 4, 1 and 6 connected together and pins 7 and 9 connected together.

21. The device according to claim 1:

wherein said cash-drawer includes a solenoid and said circuit includes a driver transistor used to generate said signal recognizable by said solenoid in said cash-drawer; and wherein said circuit further includes a diode between said driver transistor and said solenoid to protect said circuit from reverse power.

* * * * *